(12) United States Patent
Ebrahimi Afrouzi

(10) Patent No.: US 12,298,730 B1
(45) Date of Patent: *May 13, 2025

(54) METHOD FOR DEVISING A SCHEDULE BASED ON USER INPUT

(71) Applicant: Ali Ebrahimi Afrouzi, Henderson, NV (US)

(72) Inventor: Ali Ebrahimi Afrouzi, Henderson, NV (US)

(73) Assignee: AI Incorporated, Toronto (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/624,814

(22) Filed: Apr. 2, 2024

Related U.S. Application Data

(63) Continuation of application No. 18/073,379, filed on Dec. 1, 2022, now Pat. No. 11,960,262, which is a continuation of application No. 17/838,323, filed on Jun. 13, 2022, now Pat. No. 11,543,792, which is a continuation of application No. 16/667,206, filed on Oct. 29, 2019, now Pat. No. 11,442,422, which is a continuation of application No. 15/449,660, filed on Mar. 3, 2017, now Pat. No. 10,496,063.

(60) Provisional application No. 62/302,914, filed on Mar. 3, 2016.

(51) Int. Cl.
| | | |
|---|---|---|
| *G06F 17/00* | (2019.01) | |
| *A47L 11/40* | (2006.01) | |
| *B25J 9/16* | (2006.01) | |
| *B25J 11/00* | (2006.01) | |
| *G05B 19/042* | (2006.01) | |

(52) U.S. Cl.
CPC ...... *G05B 19/0426* (2013.01); *A47L 11/4011* (2013.01); *B25J 9/161* (2013.01); *B25J 11/0085* (2013.01); *A47L 2201/04* (2013.01); *G05B 2219/25419* (2013.01)

(58) Field of Classification Search
CPC ...... G05B 19/0426; G05B 2219/25419; A47L 11/4011; A47L 2201/04; B25J 9/161; B25J 11/0085
USPC .......................................................... 700/257
See application file for complete search history.

(56) References Cited

U.S. PATENT DOCUMENTS

| | | |
|---|---|---|
| 8,954,192 B2 | 2/2015 | Ozick |
| 8,972,052 B2 | 3/2015 | Chiappetta |
| 8,996,177 B2 | 3/2015 | Coenen |
| 9,008,835 B2 | 4/2015 | Dubrovsky |
| 9,050,723 B1 | 6/2015 | Elazary |
| 9,114,440 B1 | 8/2015 | Colucci |
| 9,233,472 B2 | 1/2016 | Angle |
| 9,375,847 B2 | 6/2016 | Angle |
| 9,380,922 B2 | 7/2016 | Duffley |
| 9,399,290 B2 | 7/2016 | Francis, Jr. |
| 9,427,863 B2 | 8/2016 | Lee |
| 9,603,499 B2 | 3/2017 | Friedman |
| 9,656,387 B2 | 5/2017 | Mian |
| 9,782,050 B2 | 10/2017 | Kim |
| 9,789,605 B2 | 10/2017 | Meier |
| 9,877,630 B2 | 1/2018 | Wolfe |
| 9,919,420 B1 | 3/2018 | Theobald |

(Continued)

OTHER PUBLICATIONS

Do Robot Vacuum Cleaners Use AI? (Year: 2024).*

*Primary Examiner* — Ronnie M Mancho

(57) ABSTRACT

Some aspects include a schedule development method for a robotic floor-cleaning device that recognizes patterns in user input to automatically devise a work schedule.

30 Claims, 1 Drawing Sheet

(56) References Cited

U.S. PATENT DOCUMENTS

| | | | |
|---|---|---|---|
| 9,974,422 B2 | 5/2018 | Lee | |
| 11,442,422 B1* | 9/2022 | Ebrahimi Afrouzi | ........................ G05B 19/0426 |
| 11,543,792 B1* | 1/2023 | Ebrahimi Afrouzi | ........................ B25J 11/0085 |
| 11,960,262 B2* | 4/2024 | Ebrahimi Afrouzi | ........................ G05B 19/0426 |
| 2007/0192910 A1* | 8/2007 | Vu | ................ H04N 7/142 901/1 |
| 2010/0082193 A1 | 4/2010 | Chiappetta | |
| 2014/0207280 A1* | 7/2014 | Duffley | ............... G05D 1/0016 700/257 |
| 2017/0265703 A1* | 9/2017 | Park | ....................... A47L 9/009 |
| 2023/0099055 A1* | 3/2023 | Ebrahimi Afrouzi | .... B25J 9/161 700/257 |
| 2024/0310851 A1* | 9/2024 | Ebrahimi Afrouzi | ........................ A47L 9/2873 |

* cited by examiner

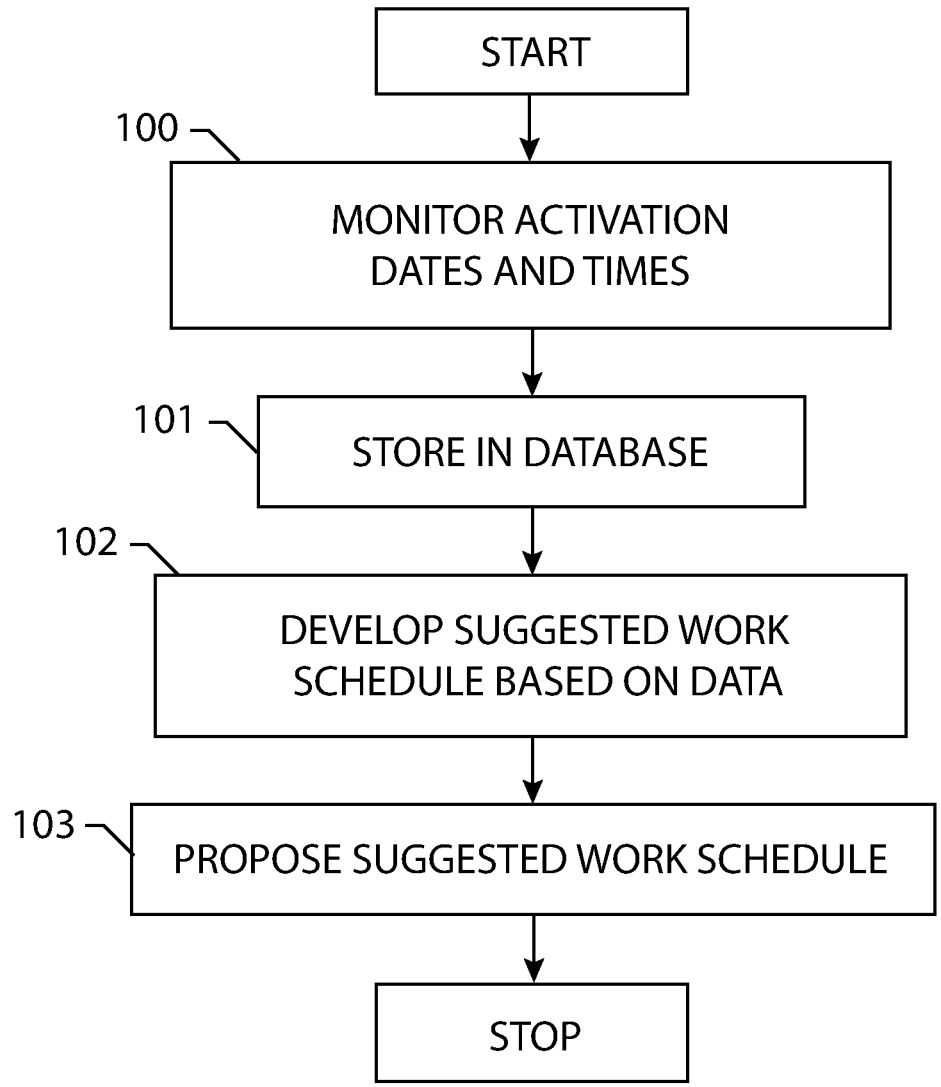

METHOD FOR DEVISING A SCHEDULE BASED ON USER INPUT

CROSS-REFERENCE TO RELATED APPLICATIONS

This application is a Continuation of U.S. Non-Provisional application Ser. No. 18/073,379, filed Dec. 1, 2022, which is a Continuation of U.S. Non-Provisional application Ser. No. 17/838,323, filed Jun. 13, 2022, which is a Continuation of U.S. Non-Provisional application Ser. No. 16/667,206, filed Oct. 29, 2019, which is a Continuation U.S. Non-Provisional patent application Ser. No. 15/449,660, filed Mar. 3, 2017, which claims the benefit of U.S. Provisional Patent Application No. 62/302,914, filed Mar. 3, 2016, each of which is hereby incorporated by reference.

FIELD OF THE DISCLOSURE

The disclosure relates to methods for devising schedules for robotic floor-cleaning devices based on historical data.

BACKGROUND

Robotic floor-cleaning devices may have scheduling systems that allow users to input schedules such that a robotic floor-cleaning device may turn on automatically at any preset time. Alternatively, a user may simply turn on a robotic floor-cleaning device to begin work at any time. Some users may benefit from a robotic floor-cleaning device that operates on a schedule but that does not require the user to take the time or energy to set up the schedule. A method for automatically devising a robotic floor-cleaning device work schedule based on user inputs may be beneficial.

SUMMARY

The following presents a simplified summary of some embodiments of the techniques described herein in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented below.

Some embodiments provide a schedule development method for a robotic floor-cleaning device that automatically devises a work schedule based on historical data. Some embodiments record user inputs indicating days and times to start work. Some embodiments develop a work schedule for future work based on the recorded inputs.

BRIEF DESCRIPTION OF DRAWINGS

FIG. 1 illustrates an example of a process for devising a suggested work schedule, according to some embodiments.

DETAILED DESCRIPTION OF SOME EMBODIMENTS

The present invention will now be described in detail with reference to a few embodiments thereof as illustrated in the accompanying drawings. In the following description, numerous specific details are set forth in order to provide a thorough understanding of the present inventions. It will be apparent, however, to one skilled in the art, that the present invention may be practiced without some or all of these specific details. In other instances, well known process steps and/or structures have not been described in detail in order to not unnecessarily obscure the present invention. Further, it should be emphasized that several inventive techniques are described, and embodiments are not limited to systems implanting all of those techniques, as various cost and engineering trade-offs may warrant systems that only afford a subset of the benefits described herein or that will be apparent to one of ordinary skill in the art.

Some embodiments disclose a robotic floor-cleaning device, including: a shell; a chassis; a set of wheels; at least one motor to drive the wheels and move the robotic floor-cleaning device in a direction on a surface; a control device to activate and control the robotic floor-cleaning device's movement, a clock, a memory unit to store data, an input/output means connected to the control unit and a cleaning unit connected to the chassis. In some embodiments, the control unit is configured to save a date and time set by a user when the robotic floor-cleaning device should be turned on. In some embodiments, the control unit is further configured to suggest a work schedule based on the saved data to the user using the input/output means.

Some embodiments disclose a method for setting a work schedule for a robotic floor-cleaning device including: monitoring use times of a robotic floor-cleaning device over a preset period of time; storing the times and dates the robotic floor-cleaning device was turned on in a database; developing a suggested work schedule based on the stored data; and proposing the suggested work schedule to users through an input/output device.

Some embodiments provide a method including: monitoring use times of a robotic floor-cleaning device over a preset period of time; storing the times and dates the robotic floor-cleaning device was turned on in a database; devising a suggested work schedule from the stored data using a machine learning technique; proposing the suggested work schedule to users through an input/output device; accepting user adjustments to the suggested work schedule through the input/output device; and adding the user adjustment data to the database for use in devising future work schedules.

One skilled in the art will appreciate that different embodiments of the invention may use different machine learning techniques such as, but not limited to, supervised learning, unsupervised learning, reinforcement learning, semi-supervised learning, etc.

In some embodiments, the input/output device may be wireless and may send and receive signals to and from remote devices, such as, for example, remote controls and smartphones.

In some embodiments, the floor-cleaning device may be scheduled directly via a user interface positioned thereon.

In some embodiments, inputs from a user and outputs from the robotic floor-cleaning device may be provided through a software application installed on an internet-connected device, such as a smartphone, a computer, or a tablet.

FIG. 1 illustrates an example of a process for devising a suggested work schedule, according to some embodiments. The process includes monitoring activation dates and times 100, storing the dates and times in a database 101, developing a suggested work schedule based on the stored data 102, and proposing the suggested work schedule 103.

In some embodiments, the suggested work schedule is developed based on times the robotic-floor cleaning device was turned on as per user-provided instruction. In some embodiments, the times the robotic-floor cleaning device was turned on is stored in a database. In some embodiments, the suggested work schedule is followed by the robotic floor-cleaning device after approval by the user of the suggested work schedule. In some embodiments, the suggested work schedule is developed based on data stored in the most recently updated database, wherein the database is continuously updated with new times the robotic-floor cleaning device was turned on.

In some embodiments, the suggested work schedule is developed based on the times the robotic-floor cleaning device was turned on that are stored in the database and using a start time that is the mean or median of the start times in the database, a start time that is the mean or median of a subset of the start times in the database, and/or using a machine learning algorithm to devise a work schedule based on the times in the database.

The invention claimed is:

1. A tangible, non-transitory, machine-readable medium storing instructions that when executed by a control unit of a robotic floor-cleaning device effectuate operations comprising:
receiving, by the control unit of the robotic floor-cleaning device, a schedule from a software application installed on an internet-connected device; wherein the internet-connected device is wireless and sends and receives signals to and from other remote devices, respectively;
saving, by the control unit of the robotic floor-cleaning device, a day and time when the robotic floor cleaning device was turned on; and
actuating, by the control unit of the robotic floor-cleaning device, the robotic floor-cleaning device to clean, wherein:
the control unit turns the robot on when the robot is to be on, based on one of: a new schedule provided by a user, an adjustment to an existing schedule provided by a user, an approval to a suggested schedule devised by the control unit of the robotic floor-cleaning device; and
the new schedule, the adjusted existing schedule, and the suggested schedule each comprise at least one day and time, wherein the internet-connected device is a smart phone.

2. The medium of claim 1, further comprising:
devising, by the control unit of the robotic floor-cleaning device, the suggested schedule using a machine learning method, wherein the machine learning method uses at least a plurality of historical user inputs.

3. The medium of claim 1, further comprising:
actuating, by the control unit of the robotic floor-cleaning device, the robotic floor-cleaning device to clean according to the suggested schedule only after user approval of the suggested schedule.

4. The medium of claim 1, wherein the operations further comprise:
storing, by the control unit of the robotic floor-cleaning device, times and dates the robotic floor-cleaning device was turned on in a database.

5. The medium of claim 4, wherein the suggested schedule is devised using at least the times and dates the robotic floor-cleaning device was turned on.

6. The medium of claim 5, wherein the suggested schedule is devised using a machine learning algorithm.

7. The medium of claim 6, wherein the machine learning algorithm comprises reinforcement learning.

8. The medium of claim 1, wherein the operations further comprise:

receiving, by the control unit of the robotic floor-cleaning device, an adjustment to the suggested schedule from the software application installed on the smartphone, wherein the user provides the adjustment to the suggested schedule through the software application installed on the smartphone; and
actuating, by the control unit of the robotic floor-cleaning device, the robotic floor-cleaning device to clean according to the adjusted suggested schedule.

9. The medium of claim 1, wherein the suggested schedule is based on historical cleaning habits of the user.

10. A robotic floor-cleaning device, comprising:
a chassis;
a set of wheels coupled to the chassis and driven by at least one motor;
a control unit;
a memory unit to store data;
a clock;
a cleaning unit; and
a tangible, non-transitory, machine-readable medium storing instructions that when executed by the control unit of the robotic floor-cleaning device effectuate operations comprising:
receiving, with the control unit of the robotic floor-cleaning device, a new schedule provided by a user, an adjustment to an existing schedule provided by a user, or an approval to a suggested schedule from a software application installed on an internet-connected device, wherein the suggested schedule is devised by the control unit of the robotic floor-cleaning device; and
actuating, by the control unit of the robotic floor-cleaning device, the robotic floor-cleaning device to clean according to the new schedule, the adjusted existing schedule, or the approved suggested schedule, wherein:
the control unit only actuates the robotic floor-cleaning device to clean according to the suggested schedule after the approval of the suggested schedule by the user; and
the new schedule, the adjusted existing schedule, and the approved suggested schedule each comprise at least one day and time.

11. The robotic-floor cleaning device of claim 10, wherein the operations further comprise:
receiving, by the control unit of the robotic floor-cleaning device, an adjustment to the suggested schedule from the software application installed on the smartphone, wherein the user provides the adjustment to the suggested schedule through the software application installed on the smartphone; and
actuating, by the control unit of the robotic floor-cleaning device, the robotic floor-cleaning device to clean according to the adjusted suggested schedule.

12. The robotic-floor cleaning device of claim 10, wherein the internet-connected device comprises at least one of: a remote control, a smartphone, a computer, and a tablet.

13. The robotic-floor cleaning device of claim 10, wherein the suggested schedule is based on historical cleaning habits of the user.

14. The robotic-floor cleaning device of claim 10, wherein the suggested schedule is devised using a machine learning algorithm.

15. The robotic-floor cleaning device of claim 14, wherein the machine learning algorithm comprises reinforcement learning.

16. The robotic-floor cleaning device of claim 15, wherein the machine learning algorithm uses at least a plurality of historical user inputs.

17. A method for automatically devising a suggested schedule for cleaning by a robotic floor-cleaning device, comprising:
- the robotic floor-cleaning device storing times and dates the robotic floor-cleaning device was turned on in a database;
- the robotic floor-cleaning device devising the suggested schedule from the times and dates stored in the database using a machine learning algorithm;
- proposing the suggested schedule through a software application installed on a smartphone;

wherein:
- the smartphone sends and receives signals wirelessly; and
- the robotic floor-cleaning device comprises:
  - a clock;
  - a memory unit to store data;
  - an input/output means; and
  - the control unit.

18. The method of claim 17, further comprising:
providing, by a user, through the software application installed on the smartphone, the approval of the suggested schedule.

19. The method of claim 18, further comprising:
actuating the robotic floor-cleaning device to clean according to the approved suggested schedule.

20. The method of claim 19, wherein the robotic floor-cleaning device cleans according to the suggested schedule only after approval of the suggested schedule by the user.

21. The method of claim 17, further comprising:
providing, by a user, through the software application installed on the smartphone, at least one adjustment to the suggested schedule.

22. The method of claim 21, further comprising:
the control unit of the robotic floor-cleaning device receiving the adjustment to the suggested schedule from the software application; and
actuating the robotic floor-cleaning device to clean according to the adjusted suggested schedule.

23. The method of claim 17, wherein the machine learning algorithm uses at least a plurality of user inputs historically provided to devise the suggested schedule.

24. The method of claim 23, wherein the plurality of user inputs are provided to the robotic floor-cleaning device through the input/output means of the robotic floor-cleaning device or through the software application installed on the smartphone.

25. The method of claim 17, wherein the machine learning algorithm comprises reinforcement learning.

26. A method for automatically devising a schedule for a robotic floor-cleaning device comprising:
- receiving, by the robotic floor-cleaning device, instructions to turn on from an interface on the robotic floor-cleaning device or from a software application executed on a smartphone;
- storing times and dates the robotic floor-cleaning device was turned on in a database;
- devising a suggested schedule based on at least the stored times and dates in the database using a machine learning method;
- proposing the suggested schedule to a user through the software application executed on the smartphone;

wherein:
- the machine learning comprises reinforcement learning; and
- the suggested schedule comprises at least one day and at least one time.

27. The method of claim 26, further comprising:
providing, by the user, through the software application executed on the smartphone, the approval of the suggested schedule.

28. The method of claim 26, wherein the machine learning method uses at least a plurality of historical user inputs.

29. The method of claim 28, wherein:
the robotic floor-cleaning device cleans according to the suggested schedule only after approval of the suggested schedule by the user.

30. The method of claim 28 wherein:
the robotic floor-cleaning device comprises a clock; and
the method further comprises:
- the control unit of robotic floor-cleaning device actuating the robotic floor-cleaning device to clean on a day and a time when the robotic floor-cleaning device is to be turned on to clean.

* * * * *